ким
United States Patent
Golokuma et al.

(10) Patent No.: US 11,790,157 B2
(45) Date of Patent: Oct. 17, 2023

(54) WEB-BASED APPLICATION USER INTERFACE (UI) IN-CONTEXT EDITOR

(71) Applicant: INTUIT INC., Mountain View, CA (US)

(72) Inventors: Mawuse Golokuma, Edmonton (CA); Lucio A. Gutierrez, Edmonton (CA)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/508,851

(22) Filed: Oct. 22, 2021

(65) Prior Publication Data
US 2022/0129622 A1  Apr. 28, 2022

Related U.S. Application Data

(60) Provisional application No. 63/104,958, filed on Oct. 23, 2020.

(51) Int. Cl.
| | |
|---|---|
| *G06F 40/166* | (2020.01) |
| *G06F 40/106* | (2020.01) |
| *G06F 3/04812* | (2022.01) |
| *G06F 40/143* | (2020.01) |
| *G06F 40/42* | (2020.01) |
| *G06F 40/205* | (2020.01) |

(52) U.S. Cl.
CPC ........ *G06F 40/166* (2020.01); *G06F 3/04812* (2013.01); *G06F 40/106* (2020.01); *G06F 40/143* (2020.01); *G06F 40/205* (2020.01); *G06F 40/42* (2020.01)

(58) Field of Classification Search
CPC .. G06F 40/166; G06F 3/04812; G06F 40/106; G06F 40/143; G06F 40/205; G06F 40/42
See application file for complete search history.

(56) References Cited

U.S. PATENT DOCUMENTS

| | | | | |
|---|---|---|---|---|
| 2004/0015408 | A1* | 1/2004 | Rauen, IV | G06Q 10/10 705/26.81 |
| 2008/0040094 | A1* | 2/2008 | Wolgemuth | G06F 40/58 704/2 |
| 2011/0077935 | A1* | 3/2011 | Viswanadha | G06F 16/957 704/7 |
| 2012/0159430 | A1* | 6/2012 | Waldbaum | G06F 9/454 717/106 |
| 2014/0244784 | A1* | 8/2014 | Jaskiewicz | H04L 67/306 709/217 |
| 2015/0309993 | A1* | 10/2015 | Wilde | H04L 67/02 715/703 |
| 2018/0046602 | A1* | 2/2018 | Sisson | G06F 40/166 |

* cited by examiner

*Primary Examiner* — Keith D Bloomquist
(74) *Attorney, Agent, or Firm* — DLA PIPER LLP (US)

(57) ABSTRACT

Systems and methods that may be used to provide in-context editing of a webpage-based user interface (UI).

18 Claims, 13 Drawing Sheets

820 → Description

- 822 — Plugin: qbo-homepage-ui
- 824 — Key: bank_module_title
- 826 — Filename: BankingWidget
- 828 — Repository: git@github.intuit.com:SBG-Plugins/qbo-homepage-ui.git
- 830 — Locale: es
- 832 — Old Text: Cuentas bancarias
- 834 — New Text: Cuenta banacarias for clients — 836
- 838 — Page URL: https://app.e2e.qbo.intuit.com/app/homepage
- 840 — Reported by: Lucio Gutierrez
  - Assignee: [~]
  - No. Customers Impacted:
  - Severity: LP-Major
  - Issue Type: LP-SourceError
- 842 — Country: Mexico

FIG. 7B

```
"title": "<span class=\"editable\" locale=\"fr-CA\" filename=\"AdditionalHelpCTA\" key=\"title\" plugin=\"qbo-homepage-ui\" a
"main_header_title": "<span class=\"editable\" locale=\"fr-CA\" filename=\"AdditionalHelpCTA\" key=\"main_header_title\" plug
"sub_title": "<span class=\"editable\" locale=\"fr-CA\" filename=\"AdditionalHelpCTA\" key=\"sub_title\" plugin=\"qbo-homepage
"migration_cta": "<span class=\"editable\" locale=\"fr-CA\" filename=\"AdditionalHelpCTA\" key=\"migration_cta\" plugin=\"qbo
"find_out_how": "<span class=\"editable\" locale=\"fr-CA\" filename=\"AdditionalHelpCTA\" key=\"find_out_how\" plugin=\"qbo-h
```

```
"title": "Garder les 2 copies de vos livres comptables",
"main_header_title": "Continuer d'utiliser QuickBooks Desktop pour l'instant",
"sub_title": "N'oubliez pas de conserver vos livres comptables aux deux endroits pendant au moins 6 à 8 semaines au cas où vo
"migration_cta": "plus? Consultez notre guide complet de l'exportation.",
"find_out_how": "Découvrez comment."
```

WEB-BASED APPLICATION USER INTERFACE (UI) IN-CONTEXT EDITOR

CROSS-REFERENCE TO RELATED APPLICATION

This application claims priority to U.S. Provisional Application Ser. No. 63/104,958, filed Oct. 23, 2020, entitled "WEB-BASED APPLICATION USER INTERFACE (UI) IN-CONTEXT EDITOR". The contents of the aforementioned patent application is hereby expressly incorporated by reference in its entirety for all purposes.

BACKGROUND

A webpage-based application is typically associated with an online service and is used by a service provider to provide an easy way for its users to interact with the online service. One of the most essential aspects of a webpage-based application is its user interface (UI). As can be appreciated, a UI with a good look and feel goes a long way towards user satisfaction and retention. A service provider may initially develop the UI for its largest client base. For example, for its United States client base, the service provider will create a UI written in English and that contains certain terms or phrases often used in the United States. This type of UI therefore provides the correct look and feel for the intended client base.

When the service provider launches the service globally, it is important for the UI to communicate the right messages that feel local to users at different locales. The correctness of the UI's text is therefore critical to building trust with the users at other locations. Even minor typographical or grammatical errors, or a mistranslated phrase, may be off-putting to the intended users and may lead to user dissatisfaction and loss of users. Traditionally, the adaptation and translation of a user interface is accomplished after the base application is completed. This is currently a slow process with little opportunity to be nimble. It often takes days or even weeks to localize the user interface for each piece of text written in the original language. If an error is discovered, the translation may need to be performed again. The slowness of this process is undesirable and may cause a delay in a product/service release in one or more new locales. In addition, the translation process can be very expensive adding costs to implement the new locale's UI, which is also undesirable.

Accordingly, there is a need and desire for a quick and efficient technique for changing and or correcting the language of a webpage-based application's UI.

BRIEF DESCRIPTION OF THE FIGURES

FIGS. 7A-7C show portions of an example UI change ticket in accordance with an embodiment of the present disclosure.

FIG. 8A illustrates an example editable string with additional metadata in accordance with an embodiment of the present disclosure.

FIG. 8B illustrates an example string corresponding to the string illustrated in FIG. 8A, but for a different locale and language.

DETAILED DESCRIPTION OF SEVERAL EMBODIMENTS

Figure 1:
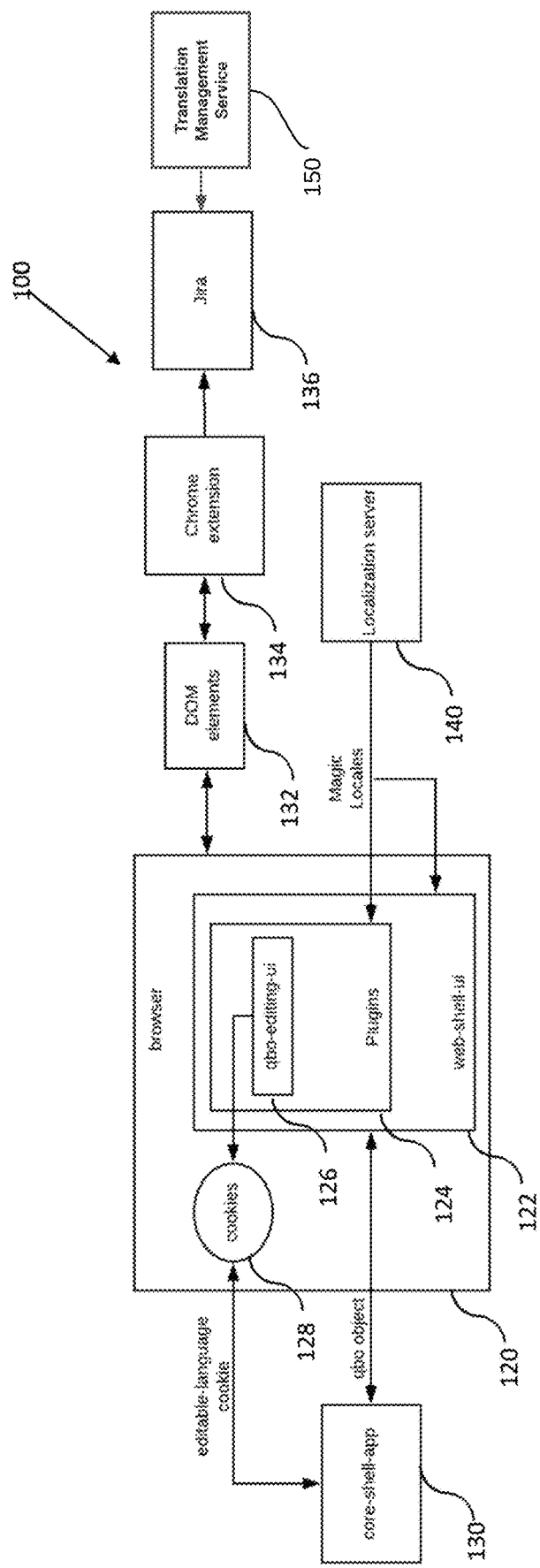
FIG. 1 shows an example architecture of an in-context UI editing tool in accordance with an embodiment of the present disclosure.

Embodiments described herein may be used to allow certain editors (e.g., developers, experts, users, etc.) to edit a webpage-based application's user interface directly using the disclosed in-context UI editing tool. The tool may be activated as the editor is using the application and enables editors to input changes directly into the UI instead of in a separate window. Translations and other text corrections can be made on the fly, verified and approved using the disclosed in-context UI editing tool. Approved changes may be ticketed for inclusion in the next release of the application. Changes may also be automatically incorporated into new builds of the application in real time. This in-context editing of the UI dramatically speeds up and reduces the costs associated with the typical UI translation process for an application production release, particularly when only a small portion of the UI needs to be updated/corrected. Additionally, the in-context editing tool may provide changes that include translations to a translation management service to improve the speed and accuracy of translations for locale specific UIs.

To enable editors to edit a webpage-based application's UI directly, the in-context UI editing tool makes strings, fields, and other components of the UI editable. The tool then listens for updates to the editable components of the UI submitted by editors and associates the updates with a particular locale. A string management system included in the in-context UI editing tool then executes a series of functions on the updated components to approve changes to the components and push the updates to the next release of the webpage-based application so that the locale specific updates are visible in the UI of the webpage-based application. The in-context UI editing tool can implement changes to the UI within minutes and release new versions of the webpage-based application frequently (e.g., daily or several times a day) to ensure new UIs are quickly tailored to each locale where they are released and minimize the number of errors that appear in the UIs.

The disclosed in-context UI editing tool may be referred to herein and illustrated in the figures as "MagicUI" for convenience purposes only and is not meant to limit the disclosed principles to a specific tradename and or product. In one or more embodiments, the in-context UI editing tool comprise a combination of four primary components: 1) a locale cookie override; 2) a runtime document object model (DOM) metadata injection process; 3) a frontend DOM parser; and 4) a string management system.

In the present disclosure, QuickBooks® Online or "QBO" is used as an example to help understand the disclosed principles. It should be appreciated that the disclosed principles may be applied to any webpage-based application, user interface and or related plugins. In addition, the disclosed principles may be used with any browser and its appropriate extensions. It should therefore be understood that the disclosed principles should not be limited to the examples discussed herein, which illustrate use with the Google® Chrome browser and Chrome extensions.

FIG. 1 shows an example architecture 100 for implementing the in-context UI editing tool in accordance with an embodiment of the present disclosure. The architecture 100 comprises a browser 120, which is the Google® Chrome browser in the examples discussed herein and illustrated in the Figures. A webpage-based UI 122 (shown as "web-shell-ui") is rendered by the browser 120. In the examples discussed herein, the UI 122 is the UI used by QuickBooks® Online. One or more plugins 124 are also illustrated in the FIG. 1 example. A dynamic language or in-context UI editing plugin 126 (shown as "qbo-editing-ui") is shown as one of the plugins 124. In one or more embodiments, the in-context UI editing plugin 126 may be selected and installed from the UI 122 as part of a "tool" menu item. A browser extension 134 (shown as "Chrome extension") required by the tool may also be installed at that time.

One or more cookies 128 are also shown as part of the browser 120. One cookie may be named "editable_language" and may be updated by the UI editing plugin 126 with a locale override, which will override the existing locale and replace it with the locale associated with the desired in-context editing and or translations. For example, the UI editing plugin 126 may initiate the locale override by pulling the correct language strings for a particular locale and metadata that will be injected into the DOM at the application's runtime.

At runtime, the language strings and metadata may get pulled from the backend and injected as part of the DOM tree in the application. This process also initiates the frontend DOM parser (e.g., a Google® Chrome Extension) which may identify each language string based on the metadata, incorporates the metadata into the HTML source code, and hides the metadata from the users. The frontend DOM parser can also identify which strings are editable by one or more pre-determined application users, referred to herein as editors. In one or more embodiments, an editor may be an employee of the service provider associated with the application, an application developer, an expert having knowledge of the application and underlying service being provided, a user of the application in a particular locale, to name a few. To edit the UI, the editor will select the language he or she wants to edit UI strings in. A list of available languages can be provided so that editor can select the language from the list. In one or more embodiments, the list may comprise: US-English, Australia-English, Brazil-English, Brazil-Portuguese, Canada-English, Canada-French, France-French, France-English, Great Britain-English, Hong Kong-Chinese, Hong Kong-English, Malaysia-English, Singapore-English, South Africa-English, United Arab Emirates-English, India-English, Mexico-English, Mexico-Spanish, rest of world (ROW)-English, ROW-French, ROW-Spanish, ROW-Italian and ROW-Chinese.

After the editor has selected the new language, the "editable_language" cookie is saved with a value corresponding to the selected editable_language and or locale. Any value can be used and a table correlating potential editable languages to cookie values may be stored in any one of the components illustrated in the example architecture 100. In one or more embodiments, when the current UI page is refreshed, a request is sent to the core-shell-application 130 and the locale variable is changed to the value associated with the "editable-language." After this point, all the plugins 124 in the application's UI 122 will read their strings from an editable locale folder. The illustrated qbo object is an abstraction of all the data and metadata that is transmitted between the backend (core-shell-app) and the frontend (web-shell-ui). This qbo object is represented in the backend as a way to access the information provided by the frontend, and the qbo object is represented in the frontend as a way to access the information provided by the backend.

The architecture 100 further comprises DOM elements 132, the browser extension 134, a project tracking service 136 (shown as "Jim") and a localization server 140. As discussed above, when "editable_language" cookie is updated with the locale override, the correct language strings and metadata will be injected into the DOM elements 132 at the application's runtime. The browser extension 134 parses the DOM elements 132 to identify which strings are now editable. For example, the browser extension may run in parallel as strings and metadata are injected into the application's DOM to visit every node in the DOM to identify all of the components that can be potentially editable. As this browser extension visits every node in the DOM, it updates the stylesheet attributes of every string node in the HTML to catch editor actions (e.g., "shift and mouse-click", pressing "enter") and turn every editable node into a text field when an editor clicks on them—thus, enabling UI strings to become editable at runtime. To associate editable strings with particular locales, the localization server 140 creates "magic locales" used by the UI 122 and plugins 124. As discussed below in more detail with respect to FIGS. 8A and 8B, magic locales are extra metadata that is injected into an editable string in accordance with the disclosed principles. For example, the extra metadata may identify a locale for the updated string, a locale for the original string, a product associated with the UI edited by the updated string, a code repository location for the build of the UI edited by the updated string, a key name for the updated string and/or original string, an English language source file, a file name for a resource bundle where the string is located, and other information associated with the string. The extra metadata is used by the browser extension 134 to detect the plugin or locale, locate the repository including code for the UI build, locate the resource bundling including the string, etc.

In one or more embodiments, two listeners on the browser extension may be used to determine when an editor is done editing a string in the UI. A first listener may track user activity (e.g., cursor movements, clicks, keystrokes, and the like) within the UI to detect when a user clicks on an editable string. The first listener may add a text box around the string in the UI so that an editor can view and edit the string inside of the text box. A second a listener on the browser extension may detect when an editor presses the enter key after editing the string and capture the updated string. The second listener may record the updated string and the original string into one file (e.g., a JSON file). Additionally, all of the updated and original strings may be saved in local storage to enable the editor to revisit the webpage, view the changed string in the UI, and/or edit the changed string if necessary.

To make the changed string visible to other users in the locale, the listener activates a backend call to the string management system, which collects metadata information and the file, including the updated and original strings. This may automatically trigger a new build to update the corresponding UI section of the application. The project tracking service 136 is used to initiate the new build to update the corresponding UI section (e.g., a plugin). In one or more embodiments, a UI change ticket will be automatically created. In keeping with the current example, the change ticket will be a Jiri ticket. The editor will be listed as the reporter for the ticket. As discussed below with respect to FIGS. 7A-7C, the UI change ticket may contain a screenshot, plugin, URL and all the relevant information about the UI changes made by the editor. The ticket will be reviewed and, if approved by a localization team, the UI change will be made the next time the plugin is deployed. The automatic triggering of a new application build and expedited review process implemented using the project tracking service 136 allows the UI updates to get propagated to production within minutes. In the present disclosure, Jira is shown as the project tracking service 136 as an example to help understand the disclosed principles. It should be appreciated that the disclosed principles may utilize any service or source code for tracking issues and performing project management that will lead to a new production release of the webpage-based application and or its UI.

The project tracking service 136 may also generate a translation update ticket that is used to update one or more translations with the updated strings. For example, the project tracking service 136 may send a translation update ticket to a translation management service 150 that includes a set of translated strings for a variety of different locales. The translation update ticket may include the updated string, the original string, a key name or other identifier for the original string, and an English source file that includes the original string in English. The translation management service 150 may use the key name to locate the original string in a set of translated strings for a particular locale. The translation management service 150 may then add the updated string as a translation for the original string and/or update an existing translation for the original string with the updated string. The translation management service 150 may also update translation memories with the updated strings. The translation memories may include a set of machine translations for English sources that may be stored in a memory cache or other working memory and automatically used to translate strings included in new application builds prior to release.

Updating the translations using the updated strings captured by the in-context UI editing tool accelerates the localization process for builds of webpage-based applications that are deployed in multiple locales. Specifically, the updated strings provide a source of crowd generated translations, which are aggregated and leveraged by the translation management service 150 to reduce the amount of strings that must be translated manually. Using the updated strings to minimize the number of machine translations accelerates the application localization process to reduce development time and costs. Additionally, incorporating the updated strings into the existing library of translations improves the quality and accuracy of the machine translations provided by the translation management service 150. Using the updated strings to correct prior translations, improves the user experience by minimizing the number of UI errors and ensuring the UI looks and feels customized for each locale.

Figure 2:
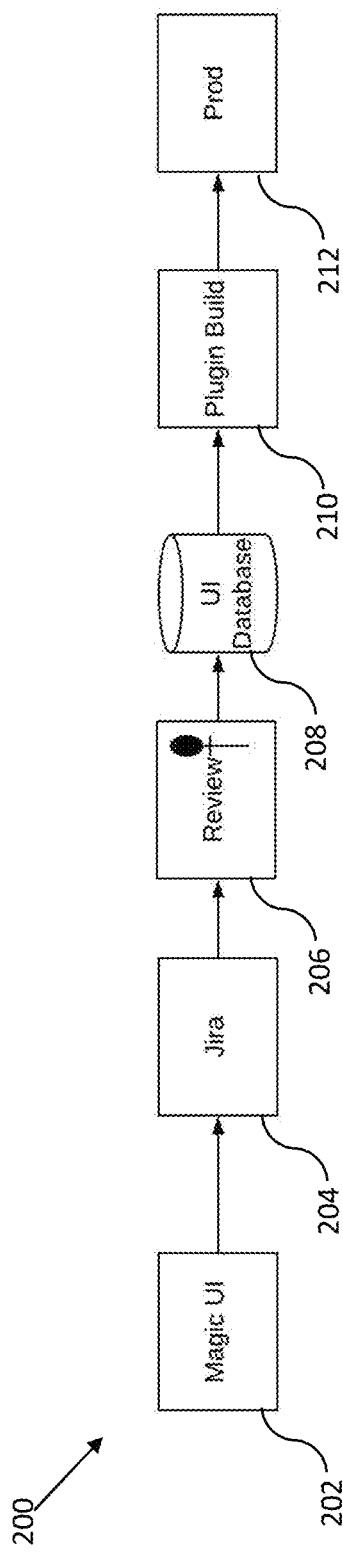
FIG. 2 shows an example process in accordance with an embodiment of the present disclosure.

FIG. 2 shows an example process 200 in accordance with an embodiment of the present disclosure. The process 200 starts with an in-context editable UI process 202 (shown as "Magic UI") and ends with a production release of the updated UI 212 (shown as "Prod"). In the illustrated process 200, once the in-context editable UI process 202 is completed, a UI change ticket is sent to a project tracking process 204 (shown as "Jiri"). The project tracking process 204 will act on the UI change ticket (e.g., Jiri ticket) by determining what changes have been made to the UI.

In the illustrated embodiment, a review process 206 is performed to determine if the UI changes are acceptable or not. In one embodiment, the review process 206 is performed manually by an expert and or someone with knowledge of the application, its UI and the customs and language of the locale. If approved, a UI database 208 is updated and will be used by a plugin build process 210 to create the production release of the updated UI in process 212.

Figure 3:
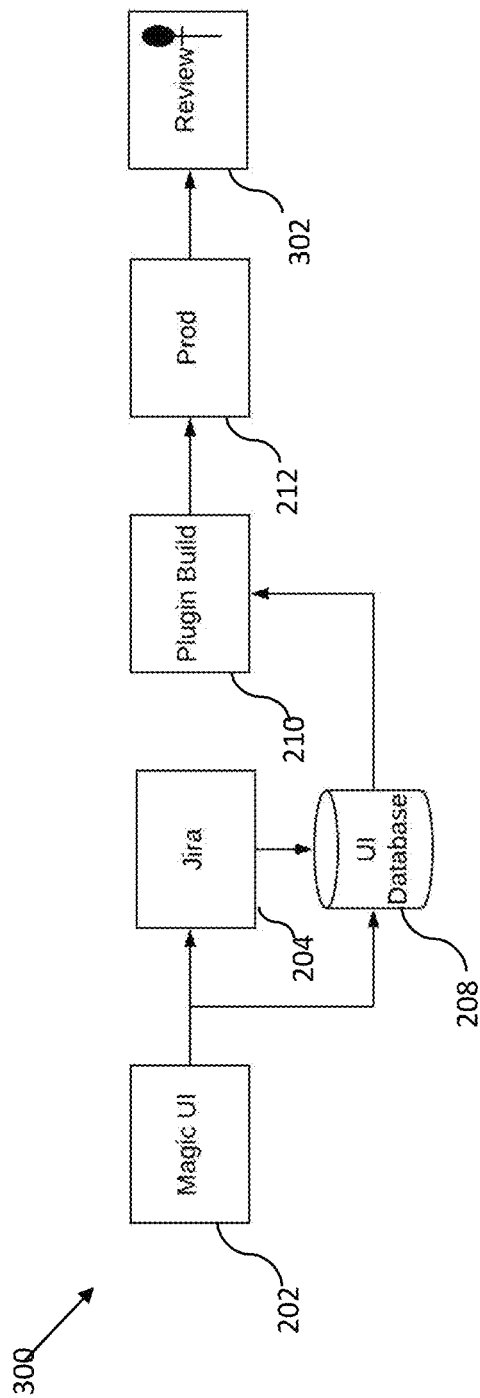
FIG. 3 shows an example of another process in accordance with an embodiment of the present disclosure.

FIG. 3 shows an example of another process 300 in accordance with an embodiment of the present disclosure. The example process 300 is designed to further speed up the overall production process. For example, once the in-context editable UI process 202 is completed, a UI change ticket is sent to the project tracking process 204 (shown as "Jiri") and to the UI database 208 in parallel. As such, the review process 206 illustrated in FIG. 2 is not performed at this stage of process 300.

The updated UI database 208 will be used by the plugin build process 210 to create the production release of the updated UI in process 212. Releasing the updated UI to production before the review process enables the UI to be updated in real time (e.g., in seconds or minutes) to minimize the amount of errors included in the UI and reduce the amount of time each error appears in production. To ensure the updated UI is accurate, the plugin may be reviewed for errors and or other issues during a review process 302 that is performed after the updated UI is released to production. The review process 302 is performed manually by an expert and or someone with knowledge of the application, its UI and the customs and language of the locale.

Figure 4:
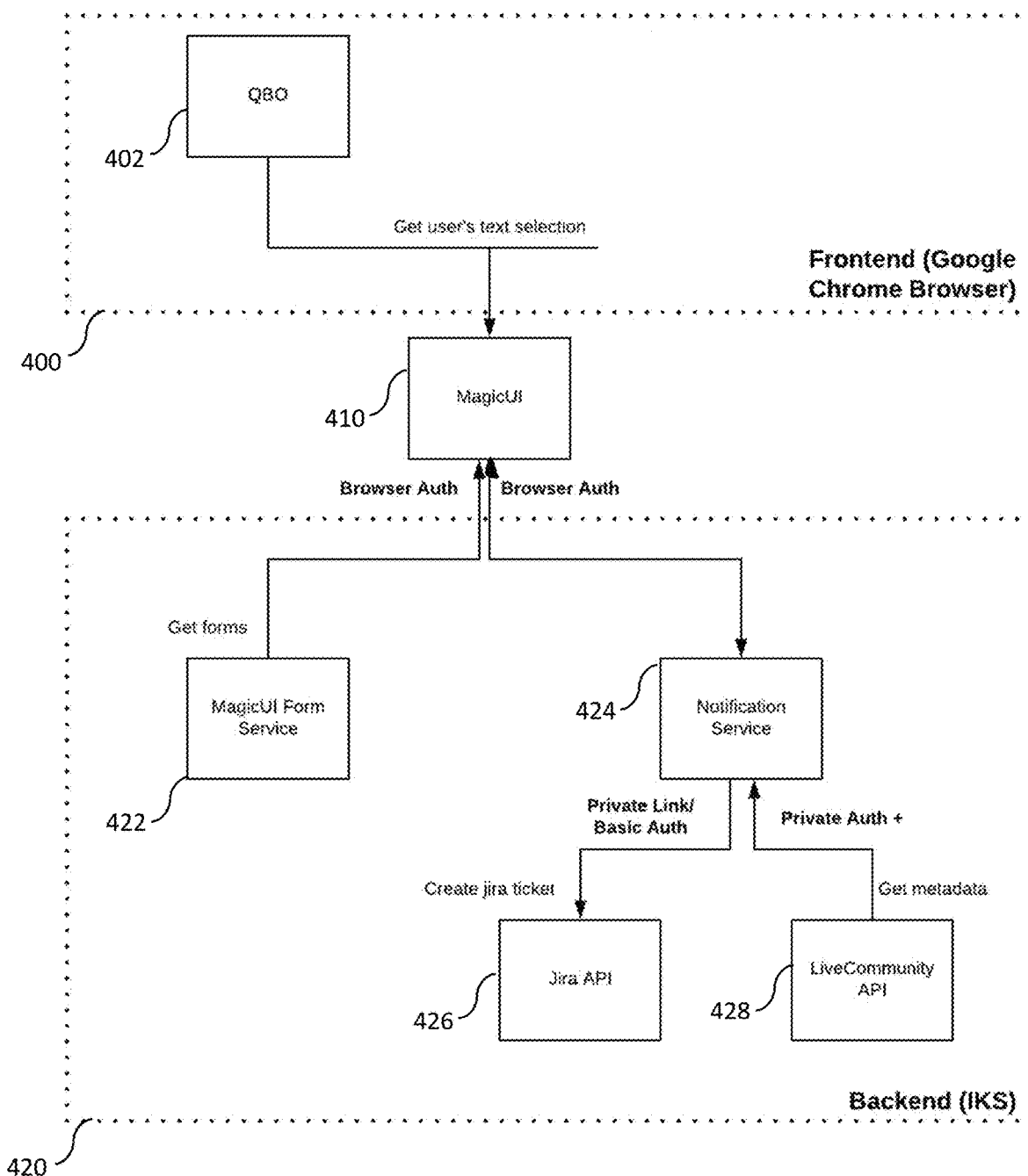
FIG. 4 shows a block diagram of an example system comprising a frontend and backend in accordance with an embodiment of the present disclosure.

FIG. 4 shows a block diagram of an example system comprising a frontend 400 and a backend 420 in accordance with an embodiment of the present disclosure. In the illustrated example, the front end 400 is shown as being implemented on a computing device running a Google® Chrome browser. However, and as discussed above, any browser may be used in the frontend 400 or system. The backend 420 may be implemented on one or more computing devices such as e.g., one or more server computers. While not intended to limit the disclosed principles. FIG. 4 contains a label IKS, which stands for Intuit Kubernetes Service. This is a technology that enables a developer to manage applications embedded in Docker images. In other words, it helps developers to install, run, restart, stop and kill Docker images that run specialized applications developed on different stacks.

In the illustrated example, a webpage-based application 402 (shown as "QBO") is run within the frontend 400 and is used to input the editor's text and other UI actions (e.g., "shift and click", pressing "enter"). The text and or UI actions are output to the in-context UI editing tool 410 (shown as "MagicUI").

The backend 420 comprises a form service 422 (shown as "MagicUI Form Service"), notification service 424, project tracking API 426 (shown as "Jiri APA"), and a live community API 428. The in-context UI editing tool 410 may input forms from the form service 422. The outputs of the in-context UI editing tool 410 may be input by the notification service 424.

The notification service 424 may output a UI change ticket (shown as "Jiri ticket") to the project tracking API 426. The notification service 424 may also alert the editor that the ticket has been issued and may also update the editor of the progress of the ticket. The notification service 424 may input metadata from the live community 428. For example, if the webpage-based application is QuickBooks® Online, the live community 428 may be the QuickBooks® community. As noted above, extra metadata is injected into the DOM tree of the application and used during the in-context UI editing processing to identify editable strings within the application's UI.

The project tracking API 426 will make the necessary API calls to the project tracking service to initiate and release a new portion of the UI in accordance with the disclosed principles.

Figure 5:
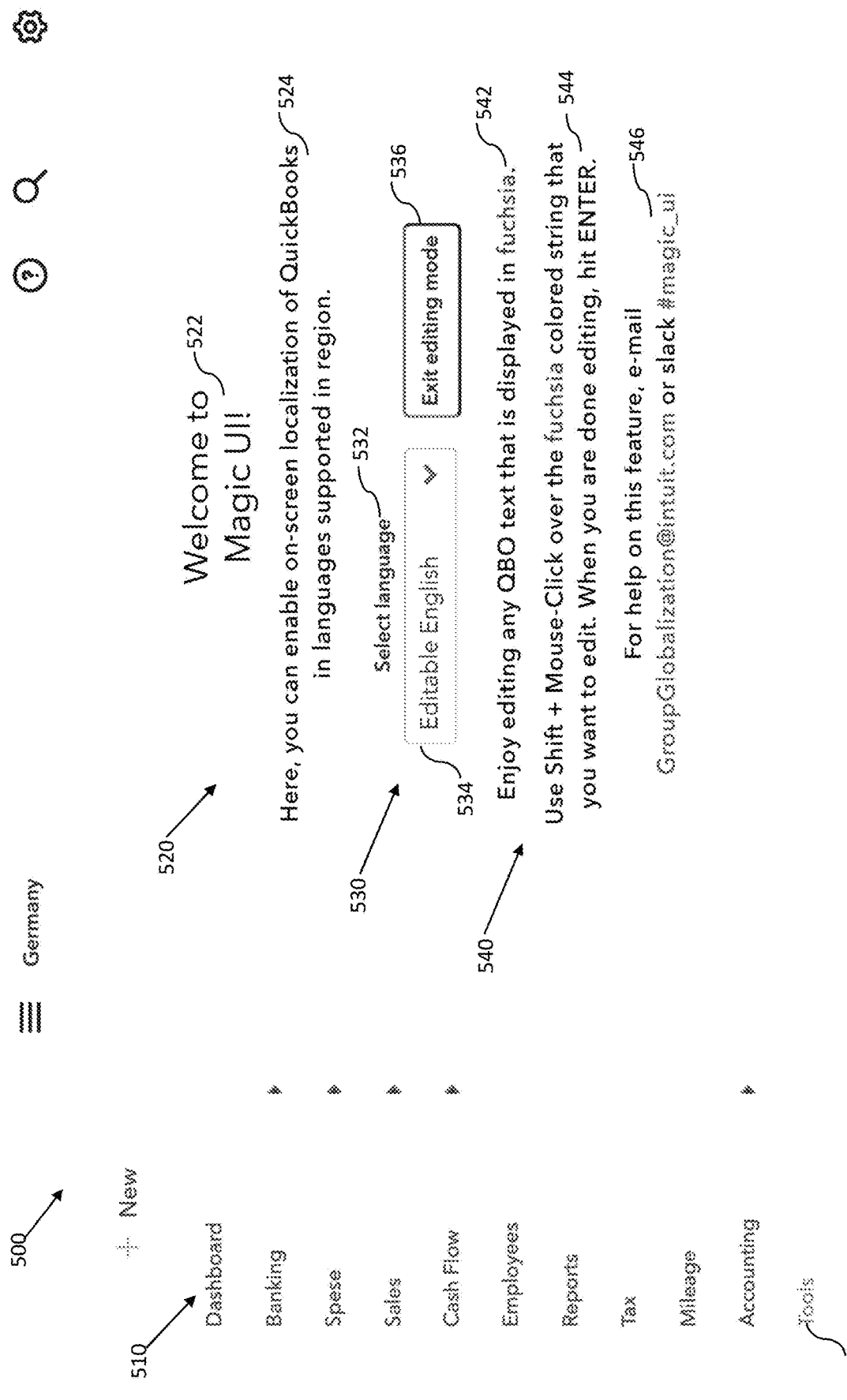
FIG. 5 shows an example page of a UI in accordance with an embodiment of the present disclosure.

FIG. 5 shows an example page 500 of a UI in accordance with an embodiment of the present disclosure. As with other examples, the illustrated page 500 is shown as being part of the UI for QuickBooks® Online. The illustrated example includes a dashboard portion 510 comprising links that an editor or other UI user may use to navigate the pages of the UI. The illustrated dashboard portion 510 includes a "tools" link 512 that was used to install and activate the in-context UI editing tool disclosed herein. In the illustrated example, the link 512 is shown in a different color than other links in the dashboard portion 510 to show that the link 512 has been selected.

The illustrated example also includes a message portion 520 used to inform the user what the page 500 features. A first text portion 522 includes a welcome message (e.g., "Welcome to Magic UI!") to alert the user that he or she has activated the in-context UI editor tool. A second text portion 524 includes an information message (e.g., "Here, you can enable on-screen localization of QuickBooks in languages supported in region.") informing the user of what he or she can do with the tool.

A functional portion 530 of the example page 500 is used to select the language the editor desires. For example, the functional portion 530 includes a drop down menu 534 associated with a header 532 containing the label "Select language." In the illustrated example, the drop down menu 534 displays "Editable English." The functional portion 530 also includes a selectable field 536 allowing the editor to "Exit editing mode" by selecting the field 536.

The illustrated example also includes an instruction portion 540 comprising fields 542, 544 and 546 providing the editor with instructions on what text can be edited, how to edit the text, and how to get help. For example, field 542 includes the text "Enjoy editing and QBO text that is displayed in fuchsia." In one or more embodiments, the phrase "in fuchsia" can be displayed in fuchsia or any color different from the colors used for the rest of the text in field 542. Thus, field 542 informs the user as to what text can be edited.

Field 544 provides the instructions for editing text. For example, the field 544 includes the text "Use Shift+Mouse-Click over the fuchsia colored string that you want to edit. When you are done editing, hit ENTER." In one or more embodiments, the word "fuchsia" can be displayed in fuchsia or any color different from the colors used for the rest of the text in field 544. Field 546 is used to inform the editor on how to obtain help via email or through a slack chatbot during use of the tool.

Figure 6A:
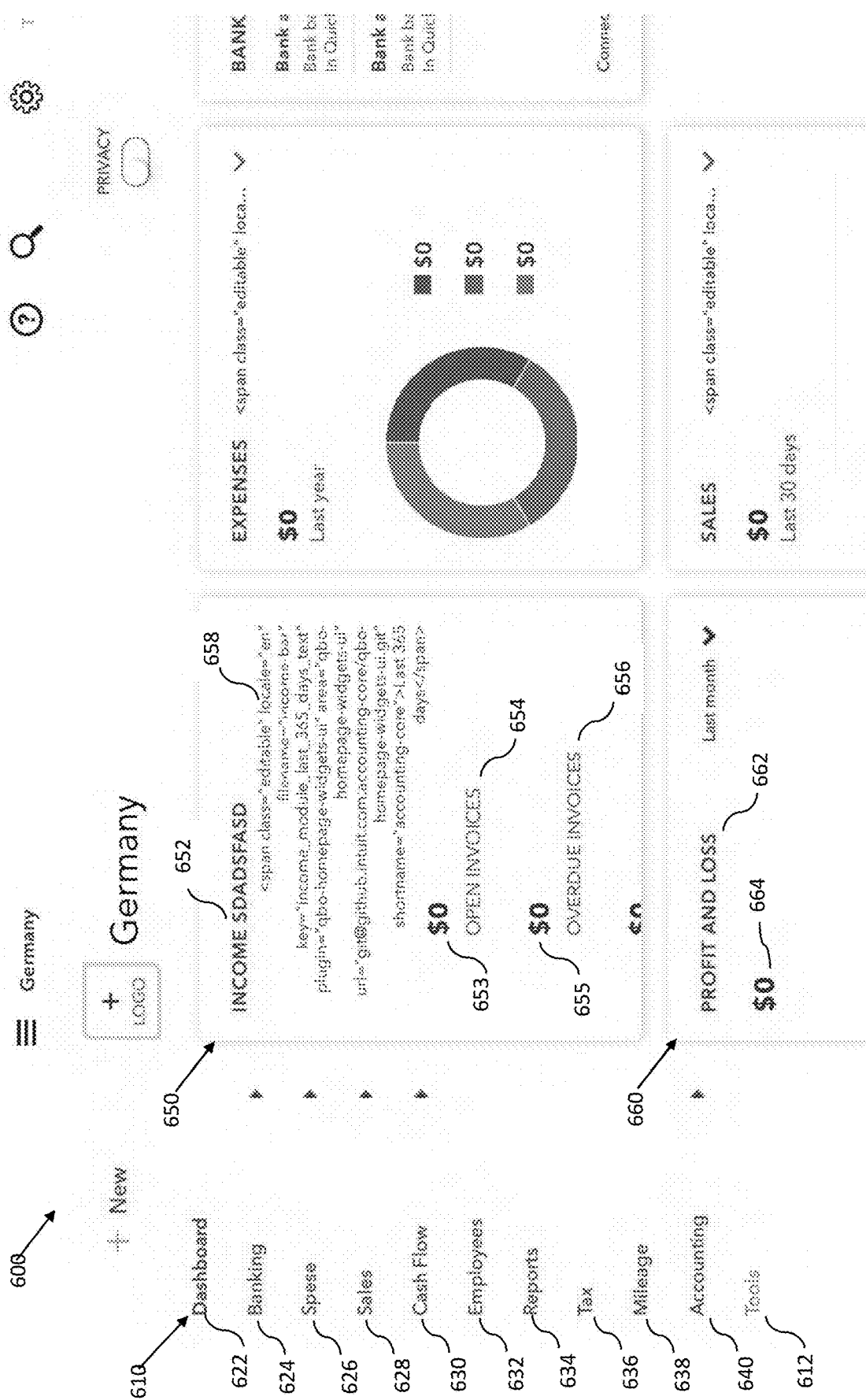
FIGS. 6A-6G show example pages of a UI undergoing in-context editing in accordance with an embodiment of the present disclosure.

FIG. 6A shows example page 600 of a UI undergoing in-context editing in accordance with an embodiment of the present disclosure. The illustrated page is written in English and comprises numerous text portions that are editable by an editor. In one or more embodiments, the editable portions are in a color different than the color used by the other portions of the page 600. For example, the editable text/strings can be displayed in Fuchsia while non-editable portions can be in black.

In the illustrated page 600, a majority of the dashboard portion 610 is editable, including the title field 622 and the selectable links 624-640. In keeping with the current example, field 622 and the selectable links 624-640 are displayed in fuchsia because their text is editable. In the illustrated example, the "tool" field 612 is not editable and is displayed in a different color than the color used for field 622 and the selectable links 624-640.

In the illustrated example, the page 600 includes a first portion 650 identified by the text 652 "INCOME". Text 652 is editable, but the value 653 associated with the "INCOME" is not. The first portion 650 comprises other editable text 654, 656 and other non-editable text 655. Again, editable text 652, 654, 656 are displayed in fuchsia, but non-editable text or fields are not. The first portion 650 also contains metadata 658 associated with the editable "INCOME" field 652. In actual use of the disclosed tool, this metadata would not be displayed and remains hidden. The metadata 658 is illustrated in FIG. 6A to show the extra metadata identified by the "span class" entries of the metadata (discussed in more detail with respect to FIGS. 8A and 8B). In the illustrated example, the locale is identified as "en" for English.

In the illustrated example, the page 600 includes a second portion 660 identified by the text 662 "PROFIT AND LOSS". Text 662 is editable, but the value 664 associated with the "PROFIT AND LOSS" is not.

Figure 6B:
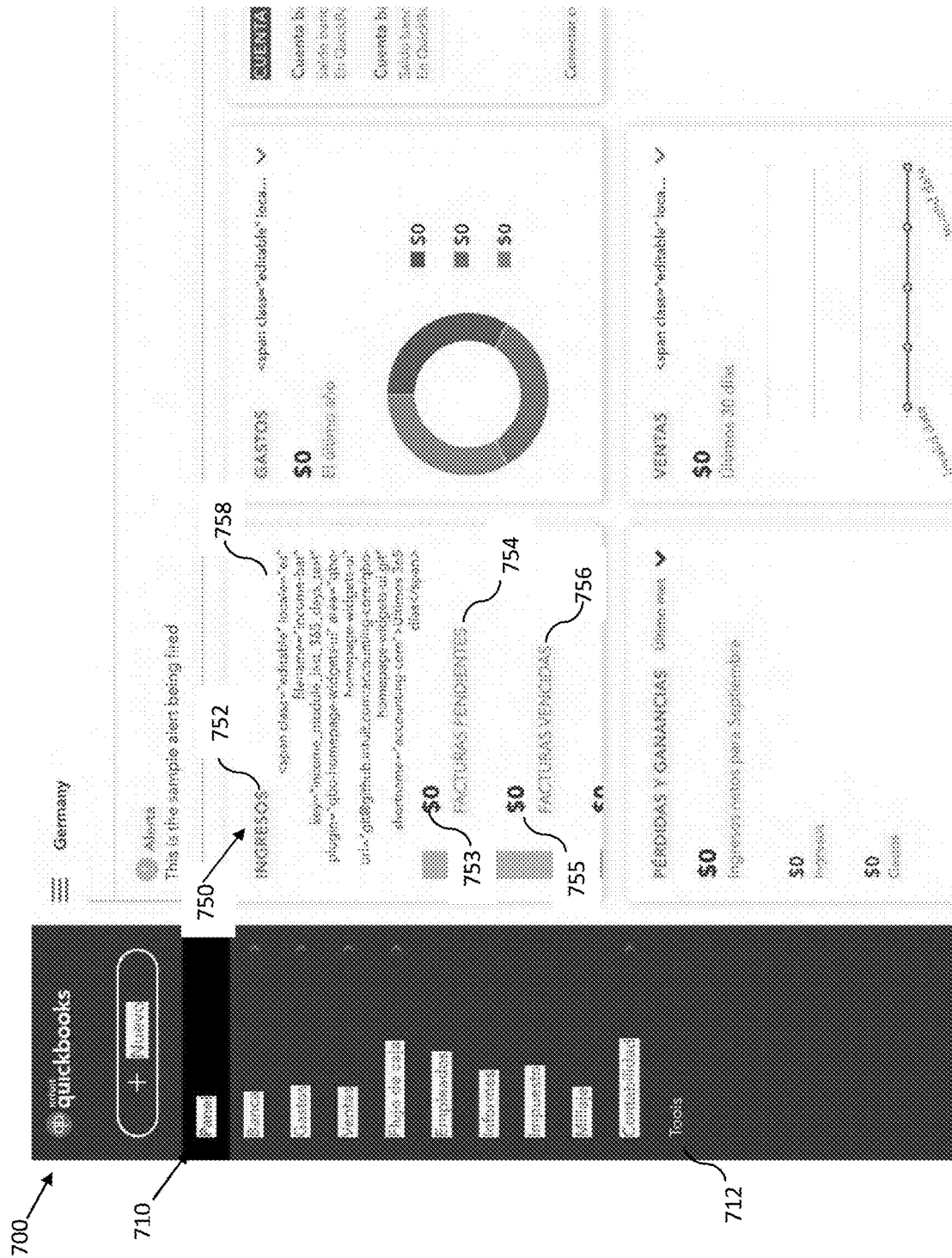
Figure 6C:
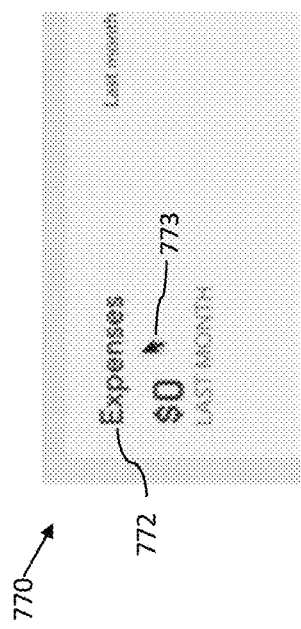

FIG. 6B shows example page 700 of a UI undergoing in-context editing in accordance with an embodiment of the present disclosure. The illustrated page 700 is written in Spanish and comprises numerous text portions that are editable by an editor. In one or more embodiments, the editable portions are in a color different than the color used by the other portions of the page 700. For example, the editable text/strings can be displayed in Fuchsia while non-editable portions can be in black.

In the illustrated page 700, a majority of the dashboard portion 710 (shown as "panel") is editable. The lone exception is the "tool" field 712, which is not editable and is displayed in a different color than the color used for editable fields and links in the dashboard.

In the illustrated example, the page 700 includes a first portion 750 identified by the text 752 "INGRESOS" (a translation of income). Text 752 is editable, but the value 753 associated with the "INGRESOS" is not. The first portion 750 comprises other editable text 754, 756 and other non-editable text 755. Editable text 752, 754, 756 are displayed in fuchsia, but non-editable text or fields are not. The first portion 750 also contains metadata 758 associated with the editable "INGRESOS" field 752. In actual use of the disclosed tool, this metadata would not be displayed and remains hidden. The metadata 758 is illustrated in FIG. 6B to show the extra metadata identified by the "span class" entries of the metadata (discussed in more detail with respect to FIGS. 8A and 8B). In the illustrated example, the locale is identified as "es" for Spanish.

Figure 6D:
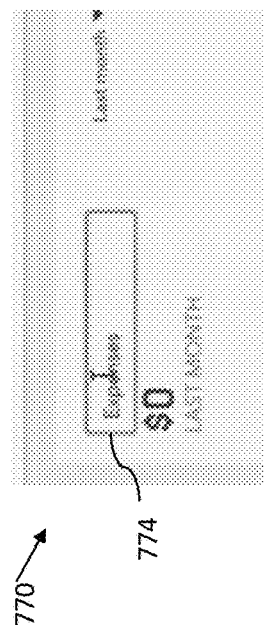
Figure 6E:
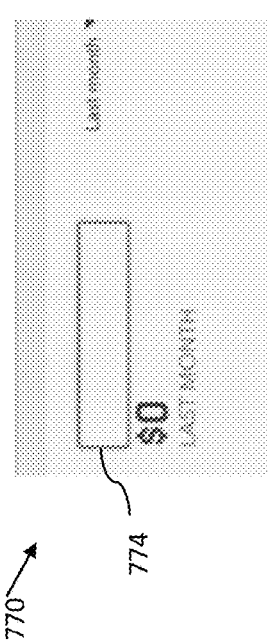
Figure 6F:
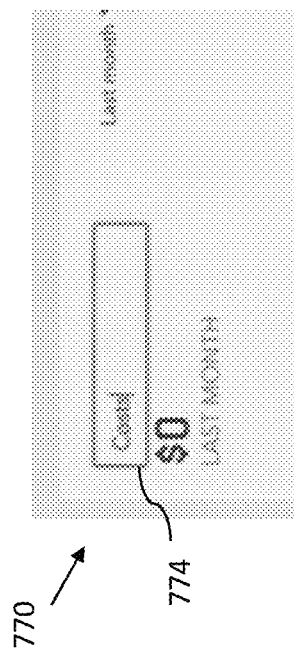
Figure 6G:
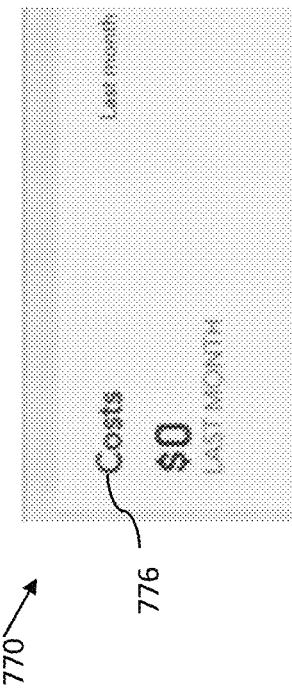

FIGS. 6C-6G illustrate a portion 770 of a page undergoing in-context editing according to the disclosed principles. FIG. 6A illustrates the portion 770 having an editable text item 772 currently containing the text "Expenses". In one or more embodiments, the editor may change the text of this item 772 or any of the editable strings/portions of the UI by using the mouse cursor 773 to select the editable text 772 using e.g., a shift and mouse-click. This is shown in FIG. 6D where the original text 772 has been converted to an editable field 774. At this point, the editable field 774 still contains the original text "Expenses". The editor may clear the field 774 as shown in FIG. 6E and then enter new text into the field 774 via the keypad. FIG. 6F shows new text "Costs" being entered into the field 774. The editor may submit the changed text by pressing the "enter" key, which converts the field 774 to text 776 (FIG. 6G). In accordance with the disclosed principles, when the editor is done editing a string in the UI, a listener on the chrome extension activates a backend call to the string management system, which collects metadata information and the updated string. This will automatically trigger a new build to update the corresponding UI section (plugin) of QBO.

Figure 7A:
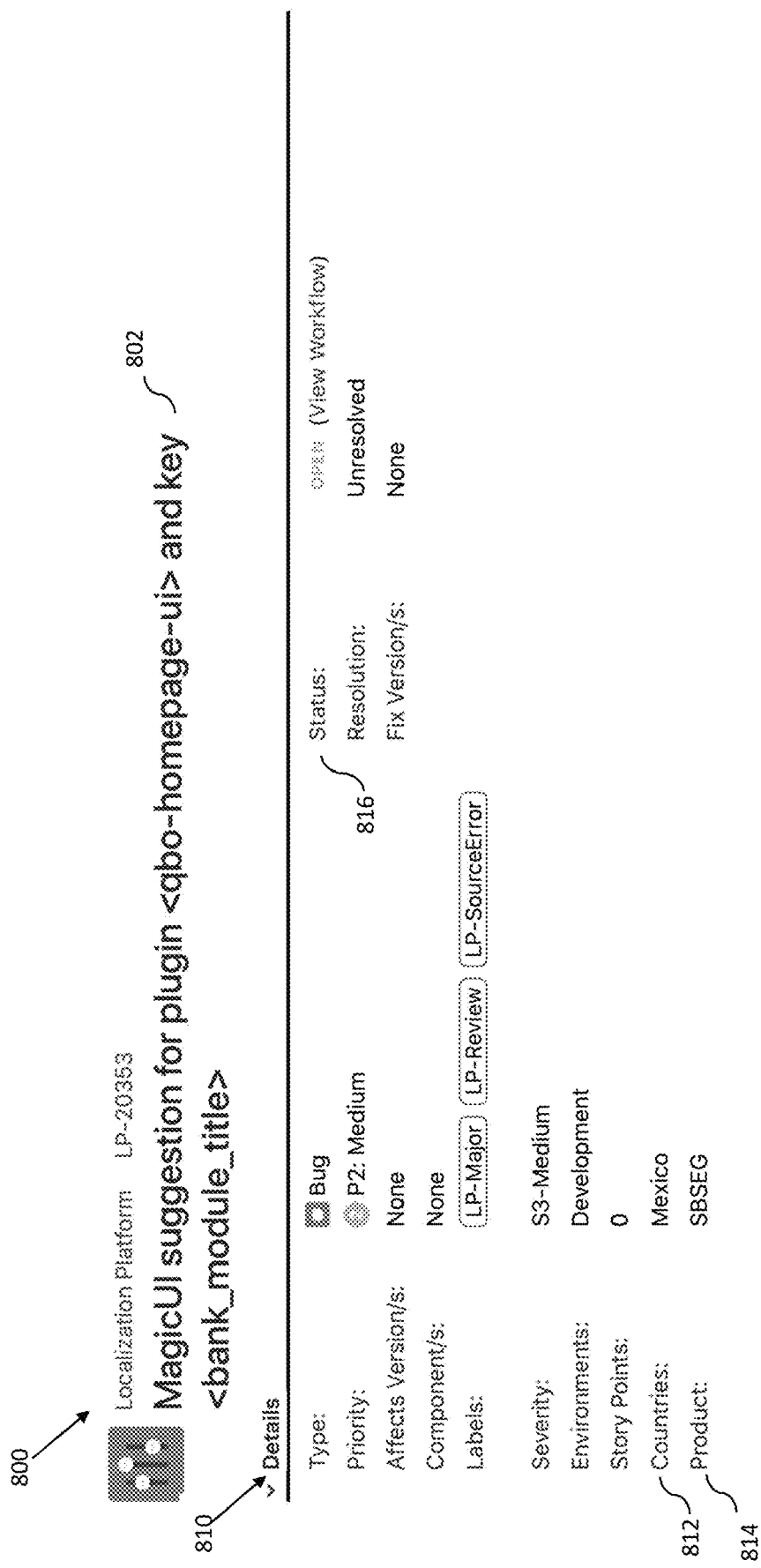
Figure 7C:
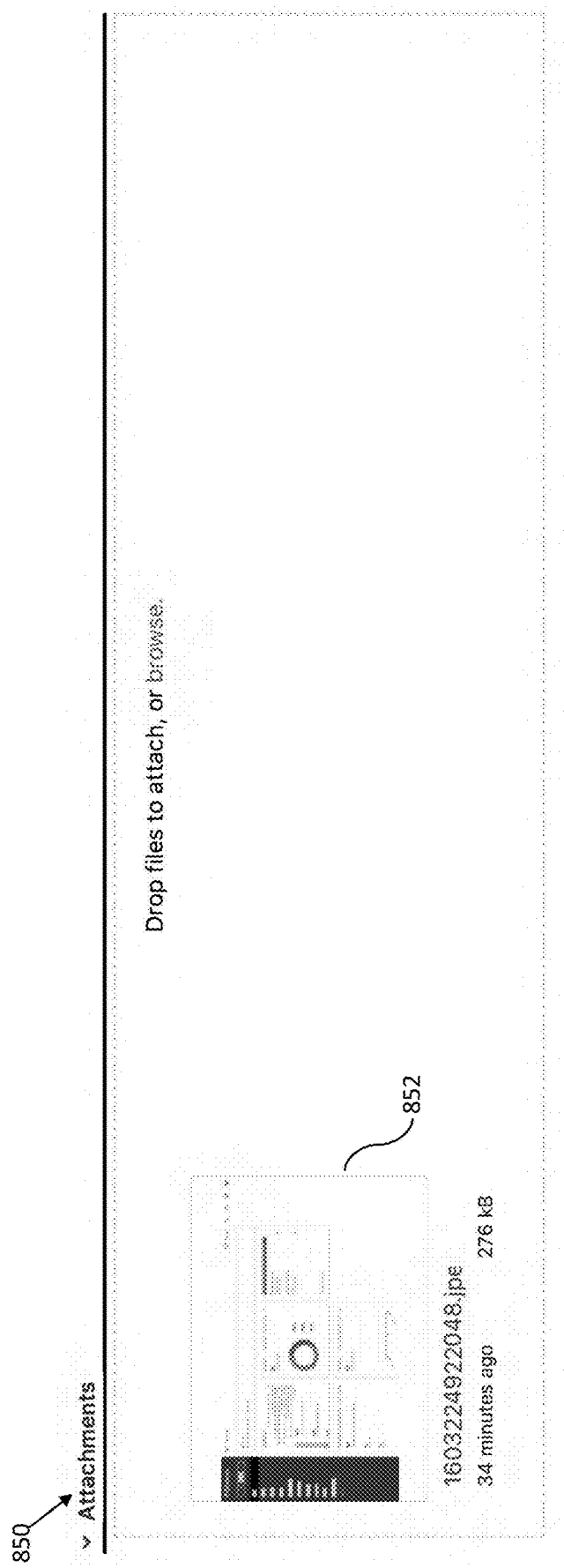

FIGS. 7A-7C show portions of an example UI change ticket 800 in accordance with an embodiment of the present disclosure. With reference to FIG. 7A, the ticket 800 includes a header 802 identifying the ticket as "MagicUI suggestion for plugin <qbo-homepage-ui> and key <bank_module_title>". As can be inferred from the header 802, the contents of the ticket 800 relate to a plugin for a QBO UI homepage and a bank module title. The "MagicUI" portion of the header 802 identifies the ticket 800 as one associated with an in-context UI edit in accordance with the disclosed principles.

The ticket 800 also includes a details portion 810 providing some details as to what the ticket relates to. Some fields of interest to the present disclosure include a countries field 812, product field 814 and a status field 816. In the illustrated example, the countries field 812 is set to Mexico, the product field 814 is set to SBSEG (i.e., a small business and self-employed product), and the status field 816 is set to open.

As shown in FIG. 7B, the ticket 800 includes a description portion 820. In the illustrated example, the description portion 820 includes a plurality of fields 822-842. A plugin field 822 identifies the plugin associated with the ticket (e.g., "qbo-homepage-ui"). A key field 824 identifies a key associated with the plugin (e.g., "bank_module_title"). A filename field 826 identifies a filename related to the plugin (e.g., "BankingWidget"). A repository field 828 identifies the repository for the related files (e.g., "git@github.intuit.com:SBG-Plugins/qbo-homepage-ui.git"). A locale field 830 identifies the locale related to the UI change (e.g., "es"). An old text field 832 identifies the text that was edited (e.g., "Cuentas bancarias"). A new text header 834 identifies the new text field 836 containing the newly entered text (e.g., "Cuenta banacarias for clients"). A page URL field 638 identifies the URL associated with the UI page being edited (e.g., https://app.e2e.qbo.intuit.com/app/homepage). A reported by field 840 identifies the editor (e.g., "Lucio Gutierrez). A country field 842 identifies the country the UI is designed for (e.g., "Mexico").

As shown in FIG. 7C, the ticket 800 includes an attachments portion 850. In the illustrated example, the attachments portion 850 includes a snapshot 852 of the edited UI page. In one or more embodiments, the UI change ticket 800 could include more or less information than what is shown in FIGS. 7A-7C and may be dependent upon the project tracking service used.

FIG. 8A illustrates an example editable string 900 with additional metadata in accordance with an embodiment of the present disclosure (i.e., a magic locale) while FIG. 8B illustrates an example string 950 corresponding to the string 900 illustrated in FIG. 8A, but for a different locale and different language. String 950 is not editable (e.g., an editor has not activated the in-context UI editing tool for the webpage for this locale) and does not include the extra metadata injected into string 900.

In accordance with the disclosed principles, an editable string 900 will have extra metadata through the insertion of a span tag around the original string (e.g., the components of the string illustrated in FIG. 8B). As known in the art, a span tag is an inline container used to mark up a portion of a text or a part of a document. The example span tag includes, among other things, an "editable" element signifying that the string is an editable string and a "locale" element identifying the locale. Other elements include "filename", "key" and "plugin", to name a few (see metadata 758 in FIG. 6B). In accordance with the disclosed principles, the metadata inside the span tag is used by the browser extension to detect the plugin, key, URL, locale, etc. needed to implement the editor's change.

Figure 9:
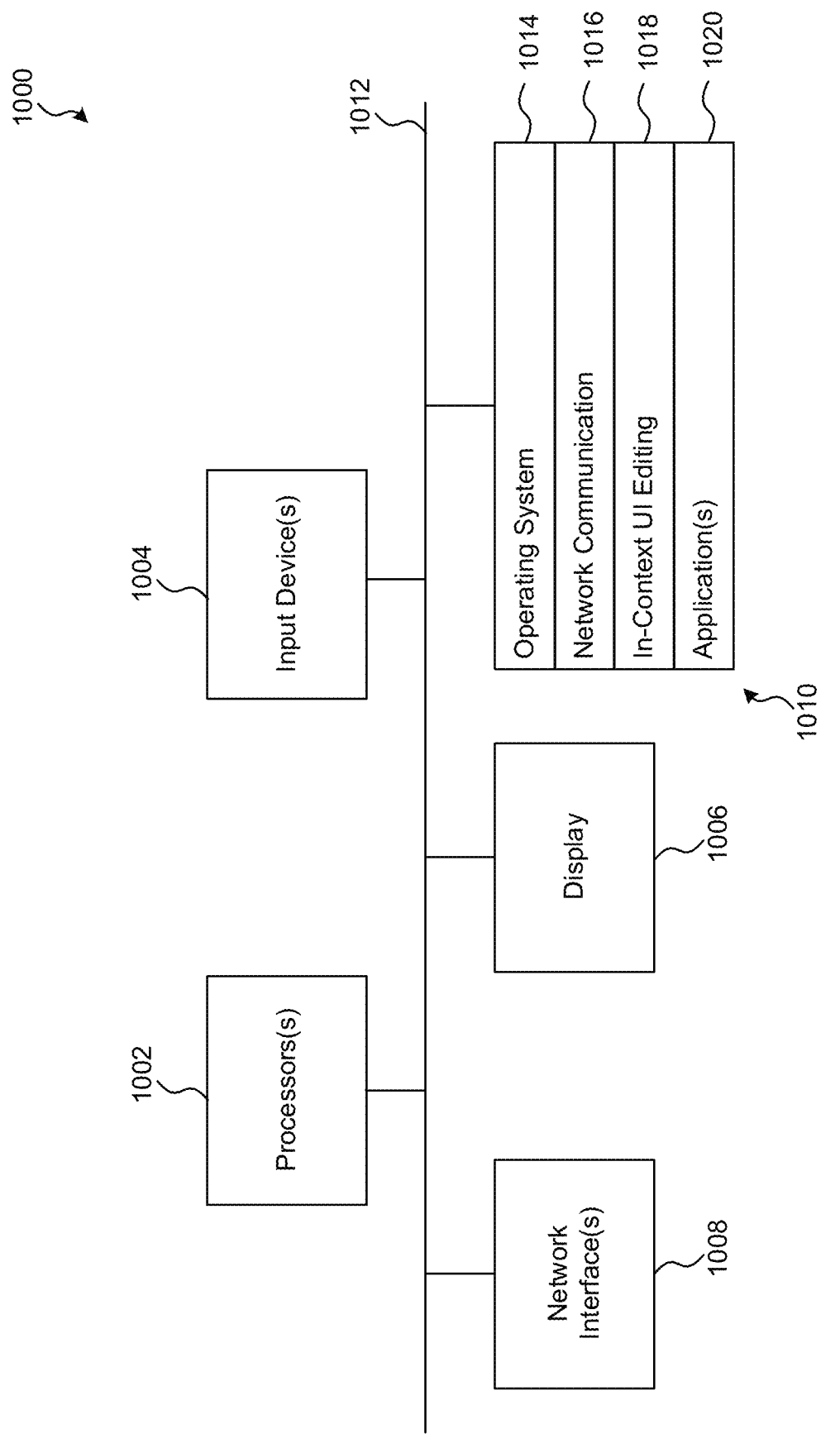
FIG. 9 shows a computing device according to an embodiment of the present disclosure.

FIG. 9 is a block diagram of an example computing device 1000 that may implement various features and processes as described herein. The computing device 1000 may be any electronic device that runs software applications derived from compiled instructions, including without limitation servers, personal computers, smart phones, media players, electronic tablets, game consoles, email devices, etc. In some implementations, the computing device 1000 may include one or more processors 1002, one or more input devices 1004, one or more display devices 1006, one or more network interfaces 1008, and one or more computer-readable media 1010. Each of these components may be coupled by a bus 1012.

Display device 1006 may be any known display technology, including but not limited to display devices using Liquid Crystal Display (LCD) or Light Emitting Diode (LED) technology. Processor(s) 602 may use any known processor technology, including but not limited to graphics processors and multi-core processors. Input device 1004 may be any known input device technology, including but not limited to a keyboard (including a virtual keyboard), mouse, track ball, and touch-sensitive pad or display. Bus 1012 may be any known internal or external bus technology, including but not limited to ISA, EISA, PCI, PCI Express, USB, Serial ATA or FireWire. Computer-readable medium 1010 may be any medium that participates in providing instructions to processor(s) 1002 for execution, including without limitation, non-volatile storage media (e.g., optical disks, magnetic disks, flash drives, etc.), or volatile media (e.g., SDRAM, ROM, etc.).

Computer-readable medium 1010 may include various instructions 1014 for implementing an operating system (e.g., Mac OS®, Windows®, Linux). The operating system may be multi-user, multiprocessing, multitasking, multi-threading, real-time, and the like. The operating system may perform basic tasks, including but not limited to: recognizing input from input device 1004; sending output to display device 1006; keeping track of files and directories on computer-readable medium 1010; controlling peripheral devices (e.g., disk drives, printers, etc.) which can be controlled directly or through an I/O controller; and managing traffic on bus 1012. Network communications instructions 1016 may establish and maintain network connections (e.g., software for implementing communication protocols, such as TCP/IP, HTTP, Ethernet, telephony, etc.).

In-context UI editing instructions 1018 may include instructions that implement the in-context UI editing processes described herein. Application(s) 1020 may be an application that uses or implements the processes described herein and/or other processes. The processes may also be implemented in operating system 1014.

The described features may be implemented in one or more computer programs that may be executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions may include, by way of example, both general and special purpose microprocessors, and the sole processor or one of multiple processors or cores, of any kind of computer. Generally, a processor may receive instructions and data from a read-only memory or a random access memory or both. The essential elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data may include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, the features may be implemented on a computer having a display device such as a CRT (cathode ray tube) or LCD (liquid crystal display) monitor for displaying information to the user and a keyboard and a pointing device such as a mouse or a trackball by which the user can provide input to the computer.

The components of the system may be connected by any form or medium of digital data communication such as a communication network. Examples of communication networks include, e.g., a telephone network, a LAN, a WAN, and the computers and networks forming the Internet.

The computer system may include clients and servers. A client and server may generally be remote from each other and may typically interact through a network. The relationship of client and server may arise by virtue of computer programs running on the respective computers and having a client-server relationship to each other.

One or more features or steps of the disclosed embodiments may be implemented using an API. An API may define one or more parameters that are passed between a calling application and other software code (e.g., an operating system, library routine, function) that provides a service, that provides data, or that performs an operation or a computation.

The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API.

In some implementations, an API call may report to an application the capabilities of a device running the application, such as input capability, output capability, processing capability, power capability, communications capability, etc.

As can be appreciated, the disclosed systems and processes provide several advantages over conventional UI correction and translation techniques. For example, existing techniques do not update production UI strings within minutes of the editor's changes and they do not enable strings to become directly editable within the UI—instead they use a pop up window. As can be appreciated, directly editing the UI allows the editor to quickly assess the change to see if the look and feel of the UI has been improved, unaltered or adversely impacted.

No other existing technique can provide these benefits, nor do they provide these benefits for UIs in multiple languages. The end to end integration proposed herein, which delivers new strings to production within minutes to all customers is a part of what makes the disclosed principles an advancement over the current state of the UI field. No product or service offered today provides this full end to end experience or the ability to update a production version of a UI within minutes of the change.

In addition, the layout and content of the disclosed user interfaces and in-context UI editing tool provide the editor with the ability to modify text within the UI while accessing the text from a single screen. That is, the editor is not directed to a different page or menu item even though strings and metadata associated with the entered text is being processed to implement the change. Accordingly, editors are provided with an interactive and graphical user interface tool that provides all necessary interfaces in one screen and with a limited and or specific amount of data via the interfaces provided by the disclosed principles.

Furthermore, the in-context editing tool may interface with a translation management service to use the updated strings captured during the editing process to improve the speed of UI localization and the accuracy of machine translation. Updated strings generated by editors may be aggregated by the translation management service as new translations for strings that are marked as needing to be translated to localize an application for a particular locale. The updated strings provide a new source of crowd generated translations that may speed up the application localization process (i.e., the process of adapting the look and feel of a UI to the language and customs of a particular locale) by reducing the number of strings that need to be translated manually. The updated strings may also be used to update and or correct existing translations to reduce the number of UI errors and generate a UI look and feel that is tailored to a particular locale.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A computer implemented method for providing in-context editing of a user interface, said method being performed on a computing device and comprising:
   inputting, through the user interface, an editor selection activating an in-context editing tool;
   converting certain text of a first page of the user interface into editable text;
   inputting, through the user interface, an editor selection of a language and one text item from the converted certain text within the user interface, the selected one text item comprising first text; and in response to inputting the editor selection of a language:
      updating a language cookie based on the editor selection of the language by at least overriding an existing locale with a locale associated with the editor selection;
      updating stylesheet attributes of each string node in the DOM associated with the certain text in hypertext markup language (HTML); and
      inputting editor actions applied to the selected one text item as the editor is accessing the user interface;
   inputting editor entered second text for the selected one text item in an editor fillable field, such that the first page of the user interface displays the second text for the selected one text item in real-time;
   detecting an enter operation performed in the editor fillable field associated with the second text; and
   automatically generating an updated production version of the first page in real-time in response to detecting the enter operation, wherein the updated production version of the first page is: generated based on the updated language cookie and automatically publicly displayed with at least the second text for the selected one text item.

2. The method of claim 1, wherein converting certain text of the user interface into editable text comprises:
   inputting an editor selection of the language for the editable text; and
   updating a document object model (DOM) associated with the user interface with strings and metadata for the certain text, the strings and metadata being based on the editor selected language.

3. The method of claim 2, wherein the metadata comprises at least the locale associated with the editor selected language, and
   the method further comprises providing the second text to a translation management service that adds the second text to a set of translations for the locale.

4. The method of claim 2, further comprising using a browser extension to parse the DOM to identify the editable text.

5. The method of claim 2, wherein the language cookie is used by a browser rendering the user interface and overriding the language cookie is further based on the input editor selection of the language.

6. The method of claim 1, wherein the updated production version is automatically publicly displayed prior to a review process.

7. The method of claim 1, wherein inputting the editor selection of the one text item from the converted certain text comprises inputting a shift and mouse-click operations performed on the one text item.

8. The method of claim 7, wherein inputting editor entered second text for the selected one text item comprises:
   converting the selected one text item into an editor fillable field.

9. The method of claim 1, further comprising displaying the editable text in a first color and displaying non-editable text in a second, different color.

10. A system for providing in-context editing of a user interface, said system comprising:
    a first computing device connected to a second computing device through a network connection, the first computing device being configured to:
    input, through the user interface, an editor selection activating an in-context editing tool;
    convert certain text of a first page of the user interface into editable text;
    input, through the user interface, an editor selection of a language and one text item from the converted certain text within the user interface, the selected one text item comprising first text; and in response to inputting the editor selection of a language:
       update a language cookie based on the editor selection of the language by at least overriding an existing locale with a locale associated with the editor selection;
       update a document object model (DOM) associated with the user interface with strings and metadata for the certain text, the strings and metadata being based on the editor selected language, wherein the metadata is configured to be used by a browser extension associated with the user interface to detect the locale and locate a repository including code for modifying the user interface;
       update stylesheet attributes of each string node in the DOM associated with the certain text in hypertext markup language (HTML);
       input editor actions applied to the selected one text item as the editor is accessing the user interface;
    input editor entered second text for the selected one text item; and
    update the first page of the user interface to display the second text for the selected one text item based on the updated language cookie.

11. The system of claim 10, wherein converting certain text of the user interface into editable text comprises:
    inputting an editor selection of the language for the editable text.

12. The system of claim 11, wherein the metadata comprises at least the locale associated with the editor selected language, and
    the computing device is further configured to provide the second text to a translation management service that adds the second text to a set of translations for the locale.

13. The system of claim 11, wherein the computing device is further configured to use a browser extension to parse the DOM to identify the editable text.

14. The system of claim 11, wherein the language cookie is used by a browser rendering the user interface and overriding the language cookie is further based on the input editor selection of the language.

15. The system of claim 10, wherein the first computing device is further configured to automatically update a production version of at least a portion of the user interface upon approval of the second text.

16. The system of claim 10, wherein inputting the editor selection of the one text item from the converted certain text comprises inputting a shift and mouse-click operations performed on the one text item.

17. The system of claim 16, wherein inputting editor entered second text for the selected one text item comprises:
    converting the selected one text item into an editor fillable field; and
    inputting the second text through the editor fillable field upon detecting an enter operation performed in the fillable field, the one text item, the editor fillable field, and the second text being displayed on the user interface without navigating from the first page.

18. A computer implemented method for providing in-context editing of a user interface, said method being performed on a computing device and comprising:
    inputting, through the user interface, an editor selection activating an in-context editing tool;
    converting certain text of a first page of the user interface into editable text;
    inputting, through the user interface, an editor selection of a language and one text item from the converted certain text within the user interface, the selected one text item comprising first text; and in response to inputting the editor selection of a language:
        updating a language cookie based on the editor selection of the language by at least overriding an existing locale with a locale associated with the editor selection;
        updating stylesheet attributes of each string node in the DOM associated with the certain text in hypertext markup language (HTML);
    inputting editor entered second text for the selected one text item; and
    updating, in real-time prior and prior to a review process, the first page of the user interface to display the second text for the selected one text item based on the updated language cookie.

* * * * *